United States Patent
Ritzman

[11] 3,860,417
[45] Jan. 14, 1975

[54] REDUCTION OF ORE IN A ROTARY DRUM
[75] Inventor: Horst Ritzmann, Neubeckum, Germany
[73] Assignee: Polysuis AG, Neubeckum, Germany
[22] Filed: Dec. 8, 1972
[21] Appl. No.: 313,597

[30] Foreign Application Priority Data
Jan. 14, 1972 Germany............................ 2201712

[52] U.S. Cl.......................................... 75/36, 75/90
[51] Int. Cl............................................ C21b 13/08
[58] Field of Search........................... 75/33–39, 90, 75/91; 432/105, 109, 108, 117; 266/18

[56] References Cited
UNITED STATES PATENTS
1,097,156  5/1914  Alford.................................... 75/37
2,277,067  3/1942  Brassert................................. 75/36
R18,929   8/1933  Debuch............................... 432/109

FOREIGN PATENTS OR APPLICATIONS
249,231  11/1962  Australia............................. 266/18

Primary Examiner—L. Dewayne Rutledge
Assistant Examiner—M. J. Andrews
Attorney, Agent, or Firm—Learman & McCulloch

[57] ABSTRACT

Ore reduction is accomplished by introducing preheated ore to a rotary drum rotated at such speed that the ore partially turns with the drum and then tumbles. Reducing carbon is introduced to the drum adjacent the lowermost turning point of the ore so that the tumbling ore substantially completely covers the carbon as it is introduced to the drum.

11 Claims, 3 Drawing Figures

REDUCTION OF ORE IN A ROTARY DRUM

This invention relates to the direct reduction of ores of all types, especially of iron ore, wherein the ore is pre-heated in a first stage of the method and immediately afterwards is reduced by carbon in a second stage of the method, with rotation of the charge.

In a known method of the type just described, the second stage of the method is carried out in a standard rotary tube furnace which, due to its relatively long construction, has a low degree of filling and rotates relatively slowly. The carbon is supplied at one or more positions in the rotary tube furnace, and partly blown in so that it falls from above on to the contents.

A disadvantage with this known method is that a considerable part of the reduction carbon reacts with the furnace atmosphere or the blown-in air before any contact with the ore takes place. Also, because of the slow rotation of the furnace, the non-consumed part of the carbon which falls from above on to the bed of material reaches the bed relatively slowly. There is, therefore, a danger that a considerable part of carbon blown on to the filling material will be entrained by the exhaust gases from the furnace and hence not contribute to reduction.

The object of the invention is therefore to avoid these disadvantages in providing a method for the direct reduction of ores (during rotation of the charge in the second stage of the method) whereby it is ensured that the introduced carbon almost completely is brought into intimate contact with the pre-heated ore in a very short time.

According to the invention this object is achieved in that the second stage of the method is carried out in a rotary drum which has a diameter: length ratio between 1:1 and 1:6, with a rotary speed between 0.15 and 0.8 of the value of the critical rotary speed, and a filling ratio (i.e., the volume of ore and reducing agent introduced to the drum as compared to the volume of the drum) between 15% and 45%. The critical speed of a rotary drum is the minimum speed of rotation at which material contained in the drum will adhere to the inner wall due to centrifugal force acting on the material.

In comparison with known rotary tube furnaces, the rotary drum used for the method in accordance with the invention has a compact, tubby shape. The length over which the reducing carbon has to be distributed is thus considerably shortened. This also reduces the time period wherein the carbon can react with the furnace atmosphere before it comes into contact with the ore.

The (volume) filling ratio between 15% and 45% used in accordance with the invention corresponds to a considerably higher level than is usual with rotary tube furnaces. Thus when the introduced carbon is covered over with the material turning in the rotary drum, the time spent by the reduction medium in the material, before renewed contact with the furnace atmosphere, is prolonged in beneficial fashion, so that the desired reaction of the carbon with the ore is promoted. At the same time the CO formed from the reaction between carbon and $CO_2$ is enabled to have especially protracted contact with the ore in the fill, so that reduction is improved.

According to the invention the rotary speed of the drum is between 0.15 and 0.8 of the critical rotary speed value (the critical rotary speed in r.p.m. is $42.3/\sqrt{D_1}$, wherein $D_1$ is the internal diameter of the drum in metres). This relatively rapid rotation of the drum facilitates the distribution of carbon in the loose material and tends to even the temperature of the material.

The method in accordance with the invention is applicable to the reduction of all types of ore, for instance nickel ore and chrome ore as well as iron ores. The ore can be reduced as coarse ore or as pelletized fine ore. Insofar as pellets are used, these must have adequate strength to withstand the relatively rapid rotary motion in the second stage of the method.

As will be explained in more detail, the method can be carried out both with uni-directional flow (of the ore and furnace gases in the rotary drum) or in counterflow. In either case, however, the carbon is preferably added in the area of the lowermost turning point of the material rotating in the rotary drum, so that immediately afterwards it is covered over by the tumbling material in the drum.

This type of feed-in ensures the rapid and complete admixture of the two components of the reaction which is aimed for, and in practice completely avoids the undesired preliminary contact of the carbon with the furnace atmosphere.

According to preferred embodiments of the method in accordance with the invention, the rotary drum has a diameter: length ratio between 1:3 and 1:4.5, runs at a rotary speed between 0.3 and 0.6 times the critical rotary speed and has a filling ratio between 20% and 30%.

A further advantageous embodiment of the method provided by the invention also lies in the use of a conical rotary drum whose lower periphery, as seen in longitudinal section, is upwardly inclined to the horizontal as it approaches the outlet end for material. The use of such a conical rotary drum is particularly considered for pelletized ores, which are given a lower bulk density by reduction. In this case a desirable separation effect between the reduced material and the freshly added material is produced inside the conical rotary drum.

Two embodiments of the invention are shown in the drawings. In these:

Figure 1:
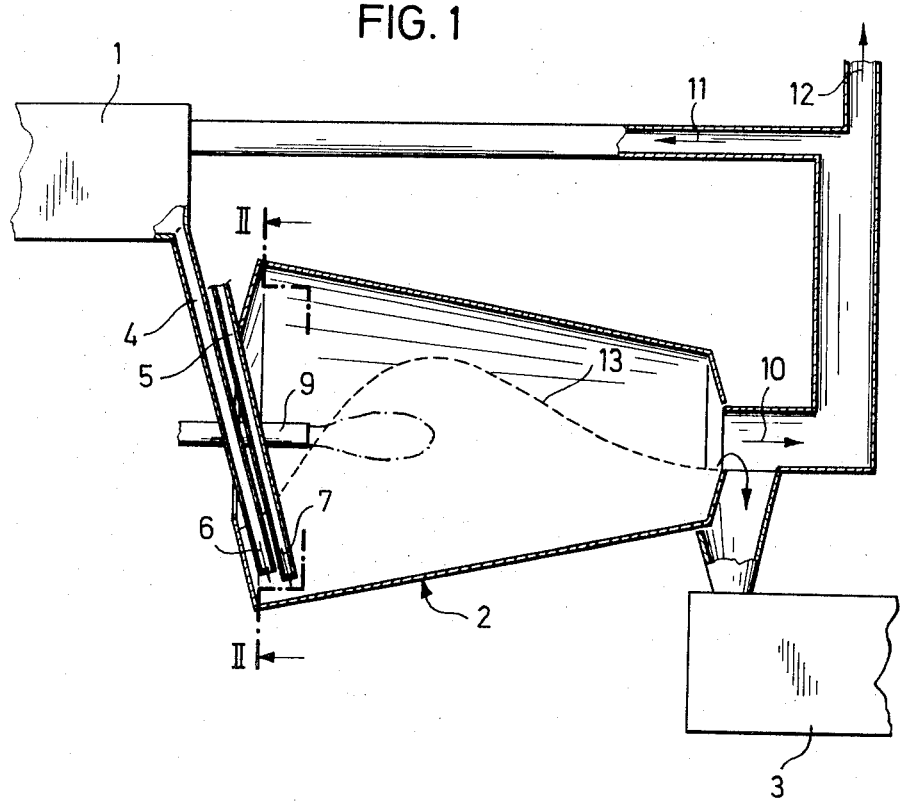
FIG. 1 is a longitudinal section through an embodiment of plant for carrying out the method in accordance with the invention, with uni-directional flow of the ore and furnace gases.
Figure 2:
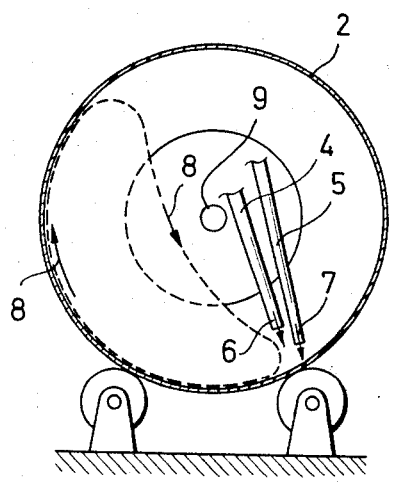
FIG. 2 is a schematic section on the line II—II in FIG. 1.

The plant in accordance with FIGS. 1 and 2 for the direct reduction of ore includes a pre-heater 1 (for example a traveling grate pre-heater), a rotary drum 2 and a cooler 3 (preferably an indirect cooler).

In the embodiment represented, the rotary drum 2 is formed as a conical drum. It has a compact, tubby shape (i.e., a relatively large diameter: length ratio), a high filling ratio, and rotates relatively fast.

In the area of its left-hand (large diameter) end, a feed conduit 4 for pre-heated ore and a feed conduit 5 for the carbon needed in reduction project into the drum. The pre-heated ore (arrow 6) and the carbon (arrow 7) are fed into the drum in the area of the lowermost turning point of the material circulated in the rotary drum (arrow 8), so that immediately after being fed in they are covered over by the tumbling material in the drum (see FIG. 2).

A burner 9 provides any additional heating required by the rotary drum. The exhaust gases from the furnace (arrow 10) are partly fed to the pre-heater 1 (arrow 11) and partly used for other purposes (arrow 12). The cooling of the reduced material takes place in the cooler 3.

Within the load of material circulated in the rotary drum 2 — schematically indicated by the dotted line 13 — the material moves with increasing degree of reduction and hence a dropping bulk density upwards and into the area of the outlet end of the drum (smaller diameter end face), so that the reduced ore is more or less automatically separated from the newly-added and pre-heated ore.

Figure 3:
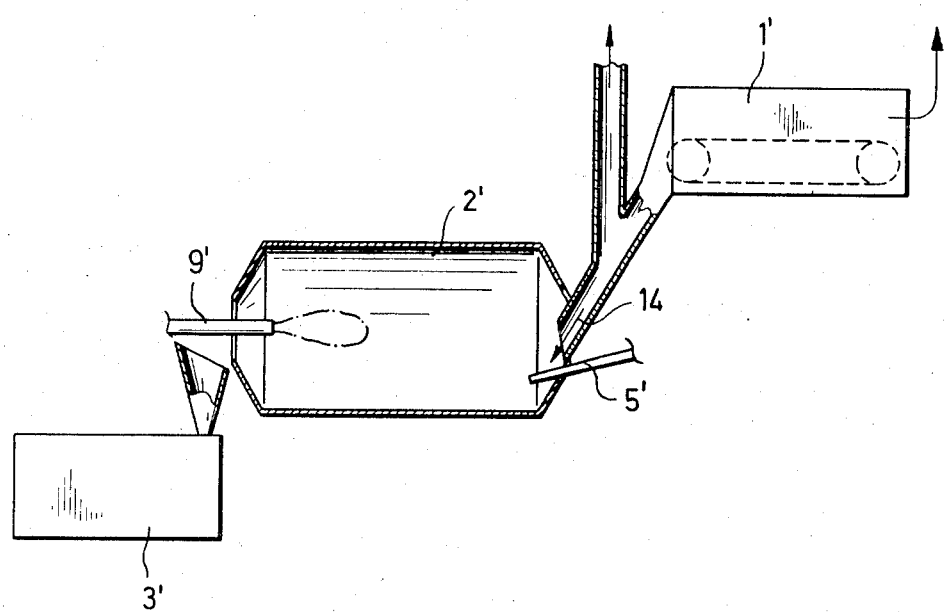
FIG. 3 is a section through a second embodiment of the invention with the ore and furnace gases in counterflow.

FIG. 3 shows an embodiment with the ore and the furance gases moving in counter-flow in the rotary drum. Corresponding components are marked with the same reference numbers, with the addition of a stroke.

The pre-heated material is fed (arrow 14) to the rotary drum 2', which in this embodiment consists of a cylindrical drum, from the pre-heater 1' at the righthand end of the drum, while the burner 9' is provided at the lefthand end. In this embodiment the carbon is added at 5', so that immediately after entry it is covered over by the material present in the drum.

What is claimed is:

1. A method for the reduction of ore comprising introducing ore and a reduction agent to one end of a rotary feeding drum at a rate between 15% and 45% of the volume of said drum; and rotating said drum at a speed between 0.15 and 0.8 its critical speed so that the contents of said drum turn and tumble as they are fed toward the opposite end of said drum, said agent being introduced to said drum at substantially the low point of turning of the contents of said drum whereby the agent introduced to said drum promptly is covered by the tumbling contents of said drum.

2. The method according to claim 1 including heating said ore prior to its introduction into said drum.

3. The method according to claim 1 wherein said reducing agent is carbon.

4. The method according to calim 1 including passing heated gases through said drum and then heating said ore by means of said gases prior to the introduction of said ore into said drum.

5. The method according to claim 1 wherein said drum is rotated at a speed between 0.3 and 0.6 times its critical rotary speed.

6. The method according to claim 1 wherein said ore is introduced to said drum at a filling ratio of between 20% and 30%.

7. The method according to claim 1 wherein said drum has a diameter to length ratio of between 1 to 1 and 1 to 6.

8. The method according to claim 1 wherein said drum has a diameter to length ratio of between 1 to 3 and 1 to 4.5.

9. The method according to claim 1 including passing heated gases through said drum.

10. The method according to claim 9 wherein the direction of flow of said gases is the same as the direction in which said ore is fed through said drum.

11. The method according to claim 9 wherein the direction of flow of said gases is the opposite of the direction in which said ore is fed through said drum.

* * * * *